United States Patent
Timmerman et al.

(10) Patent No.: US 10,713,376 B2
(45) Date of Patent: Jul. 14, 2020

(54) FINE GRAIN SECURITY FOR ANALYTIC DATA SETS

(71) Applicant: salesforce.com, inc., San Francisco, CA (US)

(72) Inventors: Jan Michael Timmerman, Vancouver (CA); Donovan Schneider, San Francisco, CA (US); Alex Gitelman, Berkeley, CA (US)

(73) Assignee: salesforce.com, inc., San Francisco, CA (US)

( * ) Notice: Subject to any disclaimer, the term of this patent is extended or adjusted under 35 U.S.C. 154(b) by 342 days.

(21) Appl. No.: 15/099,533

(22) Filed: Apr. 14, 2016

(65) Prior Publication Data

US 2017/0300712 A1    Oct. 19, 2017

(51) Int. Cl.
   *G06F 21/62*         (2013.01)
   *G06F 16/23*         (2019.01)
   (Continued)

(52) U.S. Cl.
   CPC ......... *G06F 21/6227* (2013.01); *G06F 16/23* (2019.01); *G06F 16/2456* (2019.01); *G06F 16/283* (2019.01); *G06F 16/9535* (2019.01)

(58) Field of Classification Search
   CPC .......... G06F 21/6227; G06F 17/30345; G06F 17/30498; G06F 17/30592; G06F 17/30867

(Continued)

(56) References Cited

U.S. PATENT DOCUMENTS 5,577,188 A    11/1996    Zhu
5,608,872 A    3/1997    Schwartz et al.
(Continued)

FOREIGN PATENT DOCUMENTS

WO    2010091456 A1    8/2010
WO    2017181131 A1    10/2017

OTHER PUBLICATIONS

PCT/US2017/027791—International Search Report and Written Opinion dated Jul. 26, 2017, 11 pages.
(Continued)

*Primary Examiner* — Hosain T Alam
*Assistant Examiner* — Nicholas E Allen
(74) *Attorney, Agent, or Firm* — Holland & Hart LLP

(57) ABSTRACT

The technology disclosed relates to assigning field level security to fields extracted from primary sources on a batch basis and compiled into analytical, read-only databases, for ultra-fast, ad-hoc data exploration and faceted navigation on integrated, heterogeneous data sets. The method includes assigning field level security to the extracted fields by combining user selectable inheritance of field level security from source fields that yield the extracted fields, with pinning of inheritance of field level security for the extracted fields to reference fields in the database sources wherein the reference fields are distinct from the extracted fields. The disclosed method also includes receiving additional fields as unsecured data sets, and assigning field level security to the additional fields, received by combining user selectable explicit specification of field level security for the received fields with pinning of inheritance of field level security for the received fields to reference fields in the database sources.

25 Claims, 7 Drawing Sheets

US 10,713,376 B2

Page 2

(51) Int. Cl.
*G06F 16/2455* (2019.01)
*G06F 16/9535* (2019.01)
*G06F 16/28* (2019.01)

(58) Field of Classification Search
USPC .......................................................... 707/785
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,590,641 B1 | 9/2009 | Olson |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,711,750 B1 | 5/2010 | Dutta et al. |
| 7,779,475 B2 | 8/2010 | Jakobson et al. |
| 7,818,728 B1 | 10/2010 | Olson |
| 7,840,518 B1 | 11/2010 | Rubin |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,682,925 B1 * | 3/2014 | Marquardt ........ G06F 17/30477 707/722 |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0200436 A1 | 10/2003 | Eun et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |

(56) References Cited

U.S. PATENT DOCUMENTS

| | | |
|---|---|---|
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0097060 A1 | 5/2005 | Lee et al. |
| 2005/0177570 A1 | 8/2005 | Dutta et al. |
| 2005/0262087 A1* | 11/2005 | Wu .................. G06F 16/21 |
| 2006/0021019 A1 | 1/2006 | Hinton et al. |
| 2006/0218157 A1 | 9/2006 | Sourov et al. |
| 2008/0165970 A1 | 7/2008 | Chung et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0106656 A1 | 4/2009 | Handy et al. |
| 2009/0177744 A1 | 7/2009 | Marlow et al. |
| 2009/0187586 A1 | 7/2009 | Olson |
| 2009/0222413 A1* | 9/2009 | Mattox ............... G06F 17/303 |
| 2010/0036893 A1 | 2/2010 | Serval et al. |
| 2010/0177051 A1 | 7/2010 | Bilow |
| 2010/0198804 A1* | 8/2010 | Yaskin .............. G06F 21/6218 |
| | | 707/706 |
| 2011/0106853 A1 | 5/2011 | Baker et al. |
| 2011/0218958 A1 | 9/2011 | Warshavsky et al. |
| 2011/0246504 A1* | 10/2011 | Slater ................ G06Q 10/00 |
| | | 707/769 |
| 2011/0247051 A1 | 10/2011 | Bulumulla et al. |
| 2012/0042218 A1 | 2/2012 | Cinarkaya et al. |
| 2012/0144332 A1 | 6/2012 | Sola |
| 2012/0191758 A1* | 7/2012 | Lewis ............... G06F 21/6218 |
| | | 707/784 |
| 2012/0233137 A1 | 9/2012 | Jakobson et al. |
| 2012/0290407 A1 | 11/2012 | Hubbard et al. |
| 2012/0331536 A1 | 12/2012 | Chabbewal et al. |
| 2013/0086870 A1 | 4/2013 | Pong |
| 2013/0097662 A1* | 4/2013 | Pearcy .............. G06F 21/577 |
| | | 726/1 |
| 2013/0103538 A1 | 4/2013 | Scholl et al. |
| 2013/0104251 A1* | 4/2013 | Moore ............... G06F 21/602 |
| | | 726/30 |
| 2013/0132091 A1 | 5/2013 | Skerpac |
| 2013/0204886 A1* | 8/2013 | Faith ................ G06Q 30/0631 |
| | | 707/756 |
| 2013/0212497 A1 | 8/2013 | Zelenko et al. |
| 2013/0219176 A1* | 8/2013 | Akella .............. H04L 63/0815 |
| | | 713/165 |
| 2013/0247216 A1 | 9/2013 | Cinarkaya et al. |
| 2013/0318030 A1* | 11/2013 | Nagel ............... G06F 16/254 |
| | | 707/602 |
| 2014/0040374 A1* | 2/2014 | Olsen ............... H04L 67/306 |
| | | 709/204 |
| 2014/0075571 A1* | 3/2014 | Jackson ............ G06F 21/6227 |
| | | 726/28 |
| 2014/0172775 A1* | 6/2014 | Niehoff ............ G06F 16/28 |
| | | 707/600 |
| 2014/0181013 A1* | 6/2014 | Micucci ........... G06F 16/90 |
| | | 707/610 |
| 2014/0188845 A1* | 7/2014 | Ah-Soon .......... G06F 17/30566 |
| | | 707/722 |
| 2014/0280129 A1* | 9/2014 | Howarth ........... G06F 21/62 |
| | | 707/736 |
| 2014/0289408 A1 | 9/2014 | Ishino |
| 2015/0047003 A1 | 2/2015 | Khan |
| 2015/0229638 A1 | 8/2015 | Loo |
| 2016/0044040 A1 | 2/2016 | Caffary, Jr. |

OTHER PUBLICATIONS

"Tips and Hints for Page Layouts and Field-Level Security", salesforce, Jan. 22, 2016, pp. 1-3.

SOAP API Developer's Guide, salesforce.com, inc., version 28, Aug. 23, 2013, 1344 pages.

Analytics Cloud Implementation and Data Integration Guide, salesforce.com, inc., Sep. 23, 2014, 87 pages.

EdgeSpring Legacy Content, about 2012, 97 pages.

Salesforce.com, "Row-Level Security for Datasets", <https://help.salesforce.com/apex/HTViewHelpDoc?id=bi_security_datasets_row_level_htm> version prior to Oct. 10, 2013.

Salesforce.com, "Salesforce Analytics Cloud Implementation and Data Integration Guide", Sep. 23, 2014, <https://jjra.talendforge.org/secure/attachment/74327/Analytics%20Cloud%20Implementation%20Guide.pdf>.

Salesforce.com, "Salesforce Security Guide" <http://resources.docs.salesforce.com/2007/17/en-us/sfdc/pdf/salesforce_security_impl_guide.pdf> version prior to Oct. 10, 2013.

Salesforce.com, "SOAP API Developer's Guide", May 5, 2016, <https://resources.docs.salesforce.com/200/latest/en-us/sfdc/pdf/apen_api.pdf>.

U.S. Appl. No. 14/512,230—Office Action dated Apr. 27, 2016, 8 pages.

U.S. Appl. No. 14/512,230—Response to Office Action dated Apr. 27, 2016, filed Aug. 25, 2016, 15 pages.

U.S. Appl. No. 14/512,230—Notice of Allowance dated Nov. 8, 2016, 21 pages.

Salesforce, "Wave Analytics Security Implementation Guide," Salesforce, SPring 2016, Jan. 22, 2016, pp. 1-37, (41 pages).

Salesforce.com, inc., "Reports & Dashboards and Wave Analytics," salesforce analytics cloud, 2015, pp. 1-2.

* cited by examiner

FINE GRAIN SECURITY FOR ANALYTIC DATA SETS

RELATED APPLICATION

This application is related to U.S. patent application Ser. No. 14/512,230 entitled "ROW-LEVEL SECURITY INTEGRATION OF ANALYTICAL DATA STORE WITH CLOUD ARCHITECTURE" filed Oct. 10, 2014. The related application is hereby incorporated by reference for all purposes.

FIELD OF THE TECHNOLOGY DISCLOSED

The field of the disclosed technology is fine grain security for ultra-fast, ad-hoc data exploration and faceted navigation on integrated, heterogeneous data sets.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Businesses need the ability to query and to view query results in real time, for large data sets being analyzed, in order to make informed business decisions. An analytics dataset includes a materialized collection of fields that has been optimized for ad-hoc query analysis—to make possible a sub-second query response for any query. Security for the fields of the data set is of paramount importance for the businesses.

Business customers need data security for datasets from both internal content management systems (CRMs), which include many hundreds of custom data fields on some objects, and from external entities—including other enterprise systems. CRM data security is vital in many broad categories of enterprise businesses, including sales, service marketing, social networking communities, analytics, customized applications and the Internet of Things (IoT). Data security is also paramount for data from external sources—which can be received via comma separated value (CSV) files directly uploaded to an analytics platform. Additionally, businesses require effective data security for datasets created by combining existing datasets.

Security requirements, for systems that provide business analytics "live" for large volumes of data, drive the need for the ability to control and restrict user access to data and functionality. Data security can include organization-level features such as when, where and how users can login; object-level permissions that determine what actions (e.g., create, read edit, delete) a user can perform on records of each object; and record-level permissions that grant access through default settings, sharing rules, etc. Additionally folder organization can be used to secure a variety of data for an enterprise, including reports, visualization designs, email templates and documents; folder access can be set to public, or access can be provided on a role-based basis. Field-level permissions specify which fields a user can view and edit on records of an object (e.g., specifying visible and read-only) in one implementation.

When it is desirable to deploy analytics results via a single visualization lens or group of lenses displayed as a dashboard to users with different security profiles, then either field level security (FLS) is needed; or else it becomes necessary to create copies of datasets with varying numbers of fields dependent on the permissions of each user or user profile. This requires a system of creating copies of lenses and modifying for the datasets, and then configuring application sharing to control user access to the datasets and lenses for which the user has security permissions. The second option of creating multiple similar datasets can quickly become a maintenance and security problem, and can cause a significant system performance impact. Alternatively, the first option of using field level security allows a single report to be shared across users with different security profiles, while ensuring that users see only the fields to which they have been granted access.

In an example use case, access to a sensitive field like salary needs to be limited to the employee, a human resources (HR) administrator and executive management, and needs to disallow read access to all other users. Using FLS, a report author with an HR admin profile can create a report that includes employee salaries, and the report author can confidently share the report with all HR users with full assurance that non-HR admins will not see the field or its data.

In another use case, individuals' health data must be protected to comply with Health Insurance Portability and Accountability Act (HIPAA) privacy rules. In this example, critical-information viewers (such as doctors and physicians' assistants) of patient data have profiles that specify that they can view fields that include diagnosis descriptions and prescription information—fields that an accountant in the business office of the medical facility would not have a need to see.

The disclosed technology relates to specifying and enforcing field level security on integrated, heterogeneous data sets.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

Disclosed systems and methods are usable to assign field level security to fields extracted from primary sources on a batch basis and compiled into analytical, read-only databases. The method includes assigning field level security to the extracted fields by combining user selectable inheritance of field level security from source fields that yield the extracted fields, with pinning of inheritance of field level security for the extracted fields to reference fields in the database sources.

The disclosed method also includes receiving additional fields as unsecured data sets, and assigning field level security to the additional fields, received by combining user selectable explicit specification of field level security for the received fields with pinning of inheritance of field level security for the received fields to reference fields in the database sources.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

Introduction

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Insight data analysis supports data exploration, dashboard building, and declarative representation of data visualizations. During exploration and replayed exploration, changes in data filtering, grouping and presentation format are animated, showing how a change redistributes data values. Singularly and in combination, these features can contribute to successful data analysis and presentation.

During single panel data exploration and replay, new data visualizations are animated as they are designed. Drilling down on a data segment, for instance, causes the original data segment to subdivide according to the selected regrouping and visually progress through animated subdivision growth and rearrangement into a more granular data visualization. This helps the analyst understand the data, and subsequently, explain important data segments to colleagues who are interested in the process as well as the numbers.

The disclosed methods for fine grain security for analytic data sets supports the use of a single dashboard that reports data to be shared across users with different security profiles, while ensuring that users see only the fields to which they have been granted access.

Examples of systems, apparatus, and methods according to the disclosed implementations are described in a "sales opportunity" context. The examples of sales contacts such as leads, prospects and accounts are used solely to add context and aid in the understanding of the disclosed implementations. In other instances, data with numerous elements may include medical system diagnoses and test results, insurance claims, customer service call routing, etc. or any data that would have a significant number of features. Other applications are possible, so the following examples should not be taken as definitive or limiting either in scope, context or setting. It will thus be apparent to one skilled in the art that implementations may be practiced in or outside the "sales opportunity" context.

Field Level Security Environment

Figure 1:
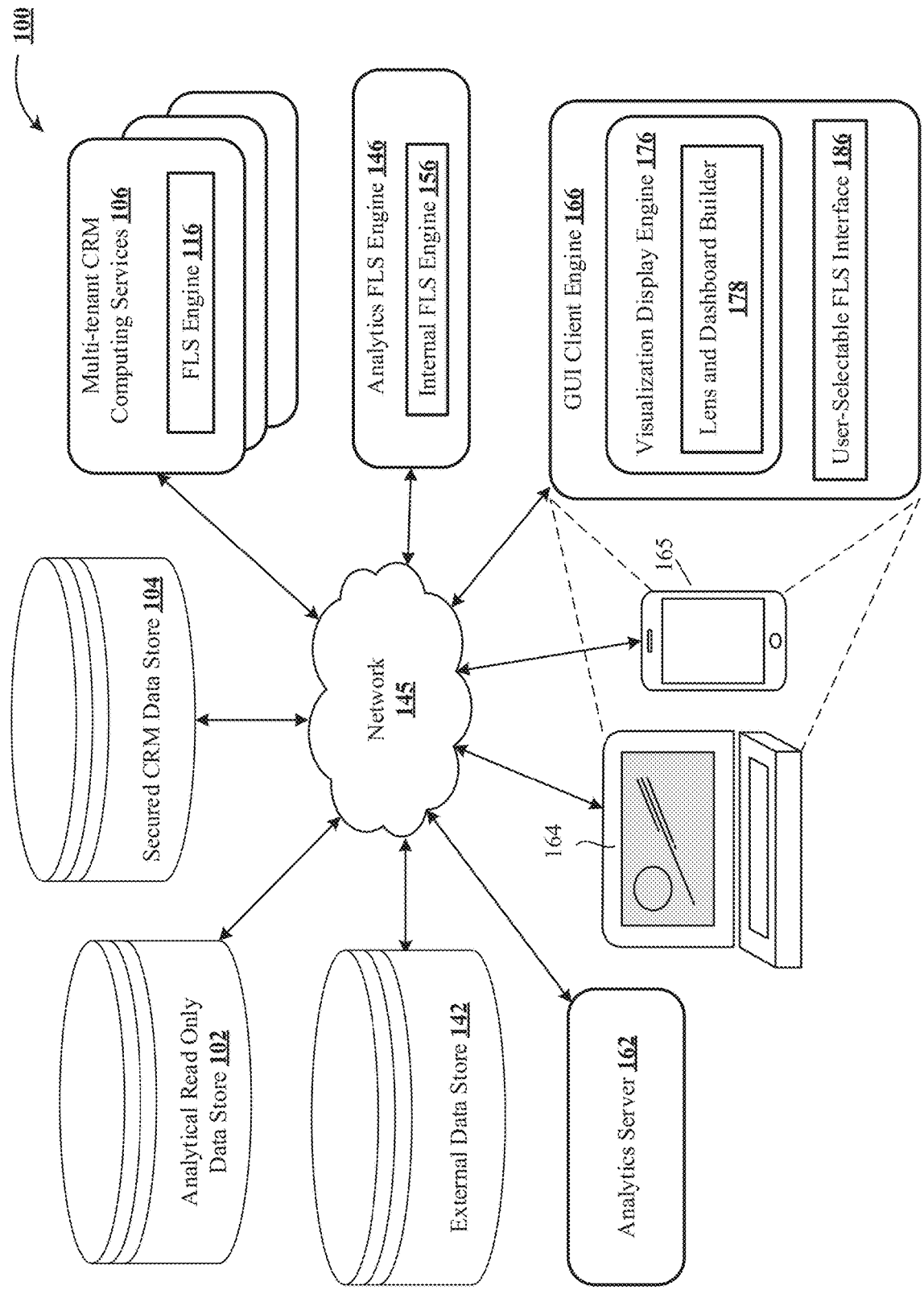
FIG. 1 illustrates an example business information and analytics architecture environment with field level security.

FIG. 1 illustrates one environment for implementing fine grain security for analytic data sets in a field level security environment 100, which includes analytical read-only data store 102, secured CRM data store 104, external data store 142 and multi-tenant CRM computing services 106. FLS filter 116, in multi-tenant CRM computing services 106, filters large data sets based on the field level security roles and permissions of a query requestor.

Analytical read-only data store 102 includes read-only datasets, with field level security attributes of multiple users, usable for querying and viewing query results in real time, for large data sets being analyzed. Secured CRM data store 104 includes datasets extracted from multi-tenant CRM computing services 106 on a batch basis, in one example. Field level security for the extracted fields can be assigned by combining user selectable inheritance of field level security from source fields that yield the extracted fields, with pinning of inheritance of field level security for the extracted fields to reference fields in the database source wherein the reference fields are distinct from the extracted fields. The data acquired (extracted) from large data repositories, along with associated field level security, can be compiled into analytical read-only data store 102, and is usable to create "raw" datasets—read-only data structures for analytics—that can be augmented, transformed, flattened, etc. and published as customer-visible datasets for business entities.

External data store 142 can include data from sources that are not part of an enterprise's content management system. Examples of external systems include but are not limited to SAP™, ORACLE E-BUSINESS™, PEOPLESOFT™, NETSUITE™ and WORKDAY™. This data can include customer purchase history, demographics, relationships, and preferences. In one example, data can be represented as comma separated values (CSV) that represent sales quotas for a competitor, provided in a spreadsheet format. Field level security can be included in the spreadsheet data representation or can be user selectable by an administrator. External data store 142 can also include data received from external sources whose field level security is assigned to the additional received fields by combining user selectable explicit specification of field level security for the fields. Data can be received in other formats—including, but not limited to, other delimiter-separated formats, bitmapped images, Ogg format containers for different types of multimedia, and proprietary file formats.

The environment shown in FIG. 1 includes analytics server 162 which handles heterogeneous data sources and related exploration, and analytics FLS engine 146 with internal FLS engine 156 for managing field level security metadata from multiple sources—including inherited, pinned and user-selected FLS. Additionally network 145 communicates among the data stores, servers, and engines described herein.

Also shown in the environment is GUI client engine 166 which includes visualization display engine 176 with lens and dashboard builder 178 for viewing live business analytics lenses and dashboards, and accepting new and updated query requests for exploring nuances of "live" analytic data. These requests can be routed to the analytics server 162 for service. Lens and dashboard builder 178 designs dashboards, displaying multiple lenses as real-time data query results. That is, an analyst can arrange display charts for multiple sets of query results on a single dashboard. When a change to a global filter affects any display chart on the dashboard, the remaining display charts on the dashboard get updated to reflect the change. Accurate live query results are produced and displayed across the set of display lenses on the dashboard, subject to the field level security permissions of the user requesting the query results. GUI client engine 166, manages the flow of analytic query requests from, and responses to the analytics server 162—for a user of mobile application 165 or user computing device 164.

A reference table with fields that have desired security profile attributes can be created, and fields in the analytic table can be pinned to fields in the reference table. That is, the field level security for fields can be inherited from a reference field in the table, with binding to existing columns and attributes in the data store.

GUI client engine 166 also includes a user-selectable FLS interface 186 usable by an administrator to select and configure security metadata options for fields in analytical read-only data store 102.

Multi-tenant CRM computing services 106 can be of varying types including a workstation, server, computing cluster, blade server, server farm, or any other data processing system or computing device; and network 145 can be any network or combination of networks of devices that communicate with one another. For example, multi-tenant CRM computing services 106 can be implemented using one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, Wi-Fi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

Analytical read-only data store 102, secured CRM data store 104, external data store 142, and multi-tenant CRM computing services 106 can be implemented using a general-purpose distributed memory caching system. In some implementations, data structures can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. Analytical, read-only databases can implement response times of under two seconds when searching over twenty million records and compiling aggregate statistics from selected records.

In some implementations, user computing device 164 can be a personal computer, a laptop computer, tablet computer, smartphone or other mobile computing device, personal digital assistant (PDA), digital image capture devices, and the like. In some implementations, user mobile device 165 can be a tablet computer, smartphone or other mobile computing device, personal digital assistant (PDA), digital image capture devices, and the like.

Visualization display engine 176 and user-selectable FLS interface 186 can take one of a number of forms, running in a browser or as an application, including user interfaces, dashboard interfaces, engagement consoles, and other interfaces, such as mobile interfaces, tablet interfaces, summary interfaces, or wearable interfaces. In some implementations, it can be hosted on a web-based or cloud-based server in an on-premise environment. In one implementation, visualization display engine 176 and user-selectable FLS interface 186 can be accessed from a browser running on a computing device. The browser can be CHROME™, INTERNET EXPLORER™, FIREFOX™, SAFARI™, OPERA™, and the like. In other implementations, visualization display engine 176 and user-selectable FLS interface 186 can run as an engagement console on a computer desktop application.

In other implementations, field level security environment 100 may not have the same elements or components as those listed above and/or may have other/different elements or components instead of, or in addition to, those listed above, such as a web server and template database. The different elements or components can be combined into single software modules and multiple software modules can run on the same hardware. Data security is considered at multiple levels in the data flow for a system; one example is described next.

Figure 2:
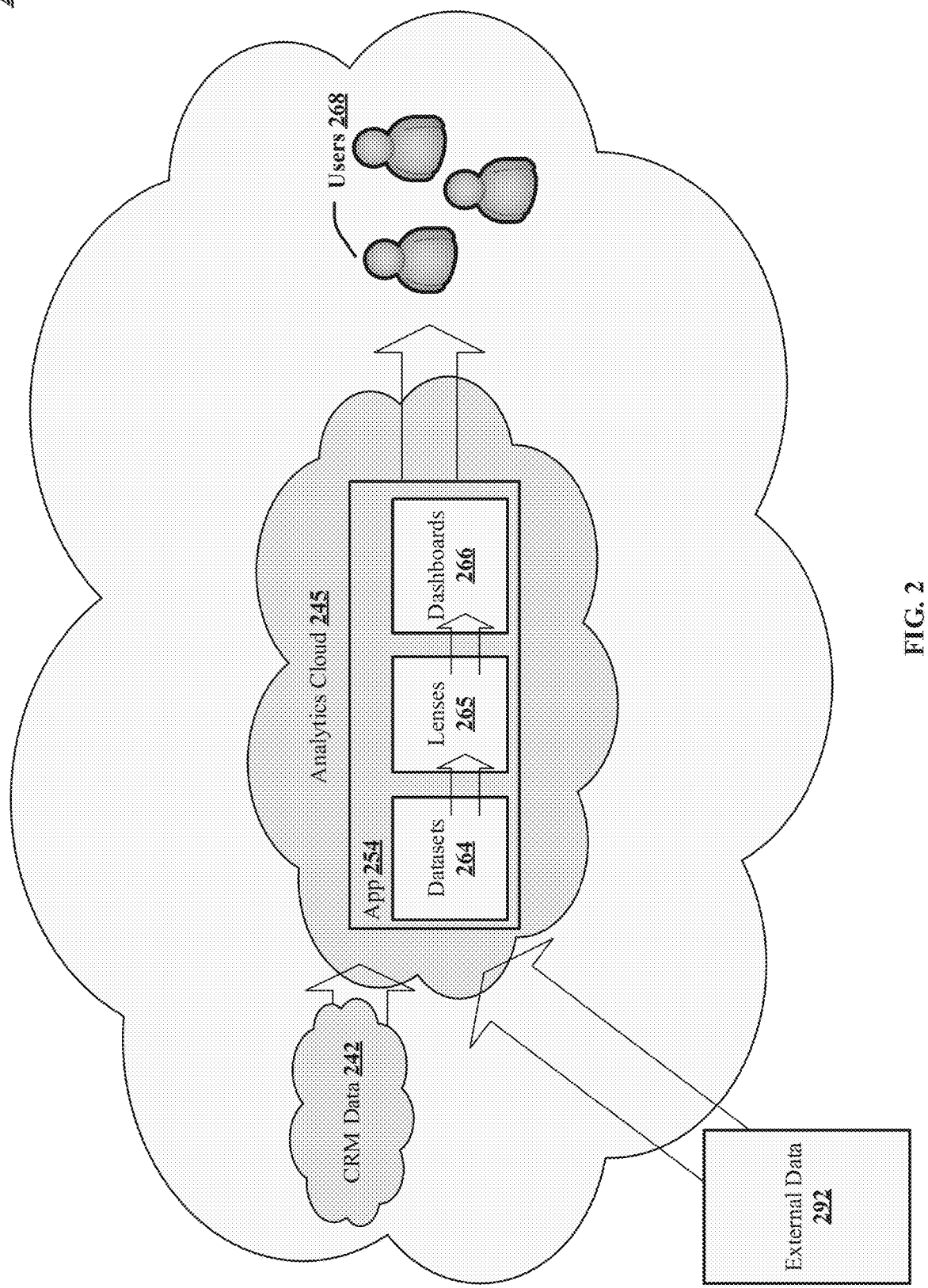
FIG. 2 shows a block diagram for example data sources for an analytics cloud environment.

FIG. 2 shows an example data flow diagram which includes, but is not limited to, CRM data 242 and external data 292. For analytics cloud 245, app 254 includes datasets 264 that incorporate data from CRM data 242 and external data 292. Datasets 264 can be rendered as lenses 265. Dashboards 266 can display multiple lenses 265 for delivery of analytics based on CRM data 242 and external data 292 to users 268.

In one use case, an administrator for the enterprise controls access to the company's CRM data 242. Dataset owners control access to records in datasets 264. App owners, administrators, and users with sufficient permissions (e.g., granted manager access to an app) control access to datasets 264, lenses 265 and dashboards 266 within the apps. The disclosed methods of delivering fine grain security via field level security can ensure that users 268 see only the data for which they have permissions. Security can be adapted to an extracted dataset that is detached at build time from the CRM relational database.

Security can also be adapted to handle data extracted from external sources, operating under different infrastructures and security models, and combined with the extracted CRM data. In one example use case, a large enterprise may be exploring boat sales by month for competing boat brands, while analyzing recent loan data extracted from a data integration enterprise whose research data targets chief intelligence officers (CIOs) senior IT leads, marketing leaders and supply chain leaders. That is, heterogeneous data from multiple external sources can be included on a dashboard for users whose profile covers the needed field level security.

For some use cases, multiple datasets need to be joined and transformed, and the field level security for resultant fields can be calculated based on a combination of field level security settings in the two or more objects whose data has been joined.

The following discussion motivates the use of joins and transformations of datasets for facilitating the delivery of "live" data analytics that can illuminate business quandaries. Various types of on-demand transactional data management systems can be integrated with analytic data stores to provide to data analysts ad hoc access to query the transaction data management systems. This can facilitate rapid building of analytic applications that use numerical values, metrics and measurements to drive business intelligence from transactional data stored in the transaction data management systems and support organizational decision making. Transaction data refers to data objects that support operations of an organization and are included in application systems that automate key business processes in different areas such as sales, service, banking, order management, manufacturing, medical records, purchasing, billing, etc. Some examples of transaction data include enterprise data (e.g. order-entry, supply-chain, shipping, invoices), sales data (e.g. accounts, leads, opportunities), medical (diagnoses, prescriptions, billing), and the like.

Extraction refers to the task of acquiring transaction data from transactional data stores, according to one implementation. This can be as simple as downloading a flat file from a database or a spreadsheet, or as sophisticated as setting up relationships with external systems that then control the transportation of data to the target system. Loading is the phase in which the captured data is deposited into a new data store such as a warehouse or a mart. In some implementations, loading can be accomplished by custom programming commands such as IMPORT in structured query language (SQL) and LOAD in Oracle Utilities. In some implementations, a plurality of application-programming interfaces (APIs) can be used, to interface with a plurality of transactional data sources, along with extraction connectors that load the transaction data into dedicated data stores.

Transformation refers to the stage of applying a series of rules or functions to the extracted or the loaded data, generally so as to convert the extracted or the loaded data to a format that is conducive for deriving analytics. Some examples of transformation include selecting only certain columns to load, translating coded values, encoding free-form values, deriving new calculated values, sorting, joining data from multiple sources, aggregation, de-normalization, transposing or pivoting data, splitting a column into multiple columns and data validation.

In one implementation, an augment transformation joins data from two datasets to enable queries across both of them. For instance, augmenting a "user dataset" with an "account dataset" can enable a data analyst to generate query that displays all account details, including the names of the account owner and creator. Augmentation transformation creates a new dataset based on data from two input dataset. Each input dataset can be identified as the left or right dataset. The new dataset includes all the columns of the left dataset and appends only the specified columns from the right dataset. Augmentation transformation performs a left, outer join, where the new dataset includes all rows from the left dataset and only matched rows from the right dataset. In another implementation, queries can be enabled that span more than two dataset. This can be achieved by augmenting two datasets at a time. For example, to augment three datasets, a first two datasets can be augmented before augmenting the resulting dataset with a third dataset.

In some implementations, a join condition in the augment transformation can be specified to determine how to match rows in the right dataset to those in the left dataset. The following example illustrates a single-column join condition. To augment the following datasets based on single-column key, an "Opportunity" is assigned as the left dataset and an "Account" is assigned as the right dataset. Also, "OpptyAcct" is specified as the relationship between them.

| Opportunity dataset | Account dataset |
|---|---|
| ID | *ID |
| Opportunity_Name | Account_Name |
| Amount | Annual_Revenue |
| Stage | Billing_Address |
| Closed_Date | |
| *Account_ID | |

An "OpptyAcct" prefix is added to all account columns and the datasets are joined based on a key defined as "Opportunity.Account_ID=Account.ID." After augmenting the two input datasets, the resulting dataset includes the following columns:

Opportunity-Account EdgeMart
ID
Opportunity_Name
Amount
Stage
Closed_Date
Account_ID
OpptyAcct.Account_Name
OpptyAcct.Annual_Revenue
OpptyAcct.Billing_Address In other implementations, different heavy-weight transformations can be applied, including a flatten transformation to create role-based access on accounts, index transformation to index one dimension column in an dataset, Ngram transformation to generate case-sensitive, full-text index based on data in an dataset, register transformation to register an dataset to make it available for queries and extract transformation to extract data from fields of a data object.

For some implementations, fine grain security for analytical data sets includes joining data from two or more objects in the primary database sources; and calculating field level security in one or more of the fields in the joined data based on a combination of field level security settings in the two or more objects.

Figure 3:
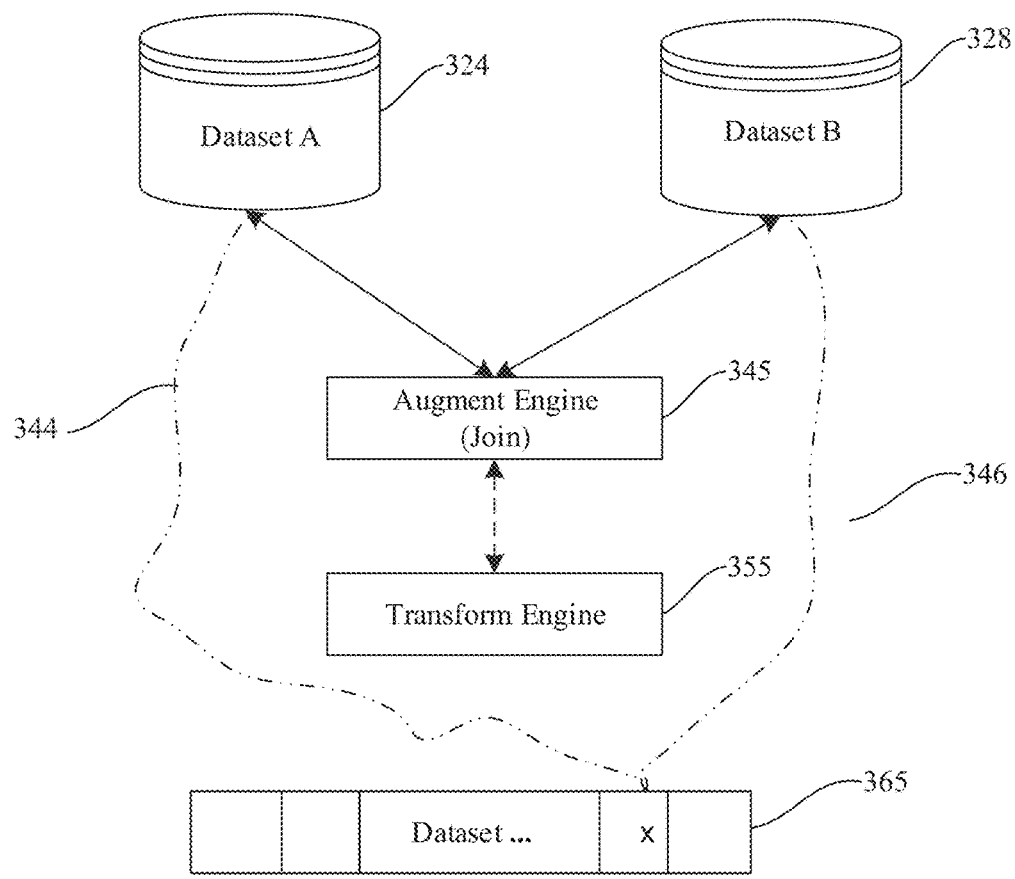
FIG. 3 shows an example field level security attribute for a combination of two joined and transformed datasets.

FIG. 3 shows an example implementation of joining two datasets 300. Augment engine 345 can join two objects: dataset A 324 and dataset B 328. In some implementations, a new field can be calculated from data in two or more fields in the primary database sources; and calculating field level security in the new field based on a combination of field level security settings in the two or more objects.

Transform engine 355 can change the results of the join. In one implementation the field level security for the resulting fields, after the join and transform, are based on the field level security settings in dataset A 324 and dataset B 328. Resultant dataset 365 includes field X with security level set to by aggregating the security 344, 346 of the fields that make up the derived field. In one example, field A has FLS dependent on column one, field B has FLS dependent on column two, and field C is derived from Field A and Field B—depending on both and bound to both, with field visibility dependent on both column one and column two. Continuing with the example, the administrator can be allowed to override this default setting: manually binding field C FLS to column one, or to column two, or to a totally different column (column three). Displaying the list of columns (one, two or 'other') would be based on the lineage information we have for field C.

Override options are useful when aggregate statistics are more widely distributed than underlying details. Roll-ups may not inherit the security restriction of the field that they summarize. Special derived security for fields can be produced from JOIN operations. Special derived security for calculated fields may deserve less security than one of the components.

Figure 4:
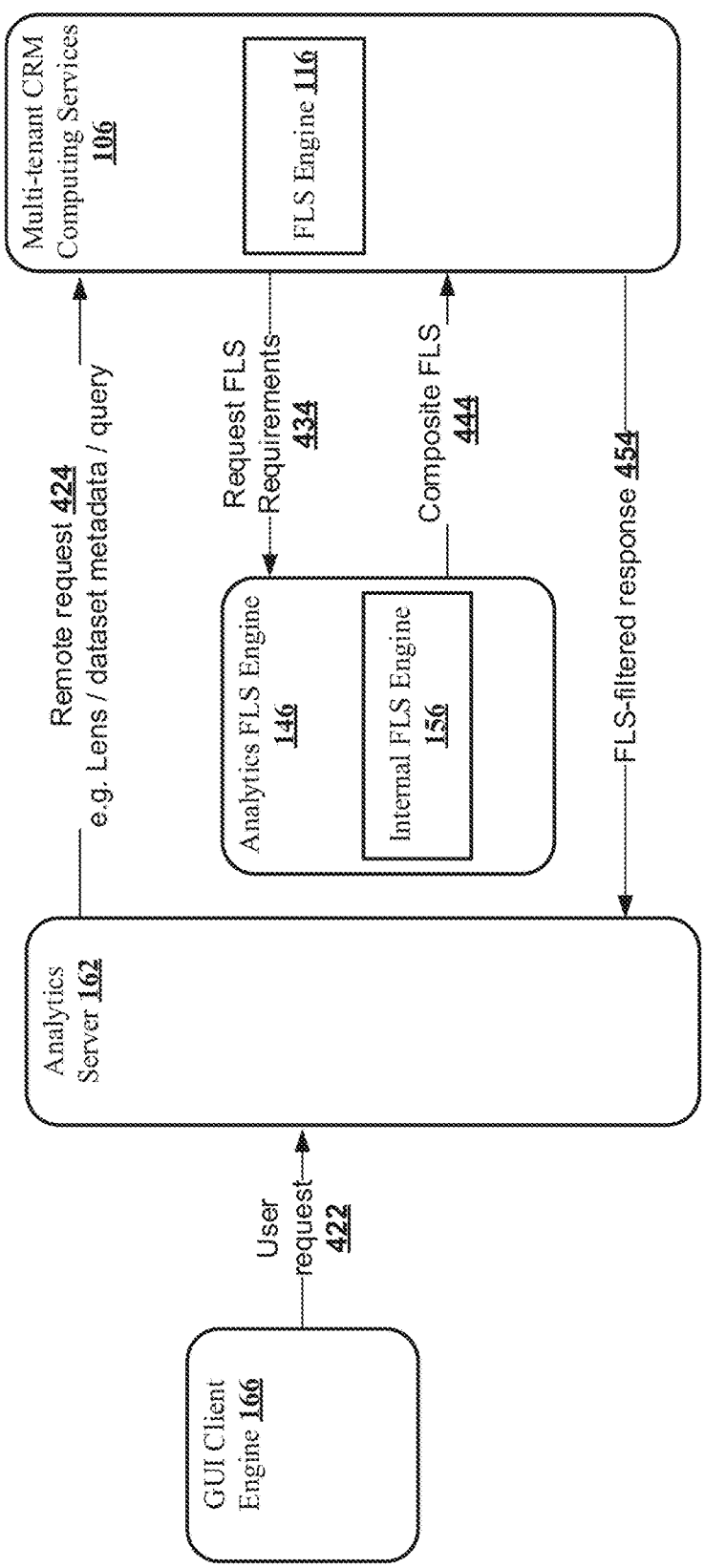
FIG. 4 shows an example block diagram with exchanged messages for a remote request.

An example block diagram in FIG. 4 displays one implementation with customized field level security requirements for users—showing requests and responses between functional blocks in the environment. GUI client engine 166 sends a request (e.g. a list of lenses, a list of datasets, a remote query for external data). Upon receipt of the request, analytics server 162 determines whether a new query is needed, and if needed, sends remote request 424 to multi-tenant CRM computing services 106, which sends a request to the internal FLS engine 156 in analytics FLS engine 146—a request for the FLS requirements 434 for the requesting user. When the composite FLS 444 for the user is returned to FLS filter 116, then the FLS-filtered response 454 gets generated and sent to analytics server 162 which serves the query results for display to the user via GUI client engine 166.

For some implementations, FLS can be specified for fields in a query. In one use case, an analytics server request includes the objects of interest, along with the field lineage for those objects. The analytics server can respond with an object which includes the fields that are allowed for the requesting user, based on their authorized FLS. The queries and responses can be delivered using JSON or another format that transmits data objects consisting of attribute-value pairs. One example of field lineage can be expressed as shown below.

```
" field3.relation1.relation2.field "
    "<entity1>" : [
        "<field1>",
        "<field2>",
        "<field3.relation1.relation2.field>",
        ...]
    "<entity2>" : [
        "<field1>",
        "<field2>",
        "<field3.relation1.relation2.field>",
        ...]
```

A user selectable FLS interface 186 can provide a screen interface for an administrator to explicitly specify field level security for extracted fields. The specified FLS, by the administrator, can override inheritance of field level security for the extracted fields.

When a user requests a lens, or a dashboard of multiple lenses, that calls for a field for which the user does not have the required field level security profile, the GUI can deliver a message that conveys to the user that their request cannot be completed. For some implementations, if any field needed for rendering the lens is not viewable by the user, then the lens is not delivered, and a UI that communicates "lens not visible" can be displayed. This result can occur in cases when the user is requesting display of a list of available lenses, and also in cases when the user requests to run a lens query. Similarly, if a user has one or more lenses for which they lack security permissions, then the dashboard can hide the lens, in some implementations, and can display a message that communicates that the lens is hidden from the user in other cases.

In some use cases, when a user lacks the required FLS profile, the fields for which they lack security permissions can be pruned from the available fields for the project, and a subset of the fields can be used to create a runnable query. Visualization success may be limited in this scenario.

In another implementation, a list of fields needed to complete a user's query can be included in the FLS-filtered response to analytics server 162 and queries for lenses and dashboards can be filtered based on the returned list of allowable fields. The analytics server 162 can inspect the fields needed to satisfy the queries in the stored visualizations: lenses and dashboards. The list of lenses and dashboards provided to the GUI 166 can then be filtered by the analytics server 162. This will prevent users from attempting to view lenses and dashboards which will error out and cause display of a "lens not visible" message. For situations in which an advanced user attempts to type in a field name for which they do not have field level security access, the system does not acknowledge recognition of the field name. The disclosed technology includes a specification for extracting the fields of data that includes an advanced search comprising a user-entered string recognized as a field to which the user does not have field level access and treating the recognized string as not recognized.

Figure 5:
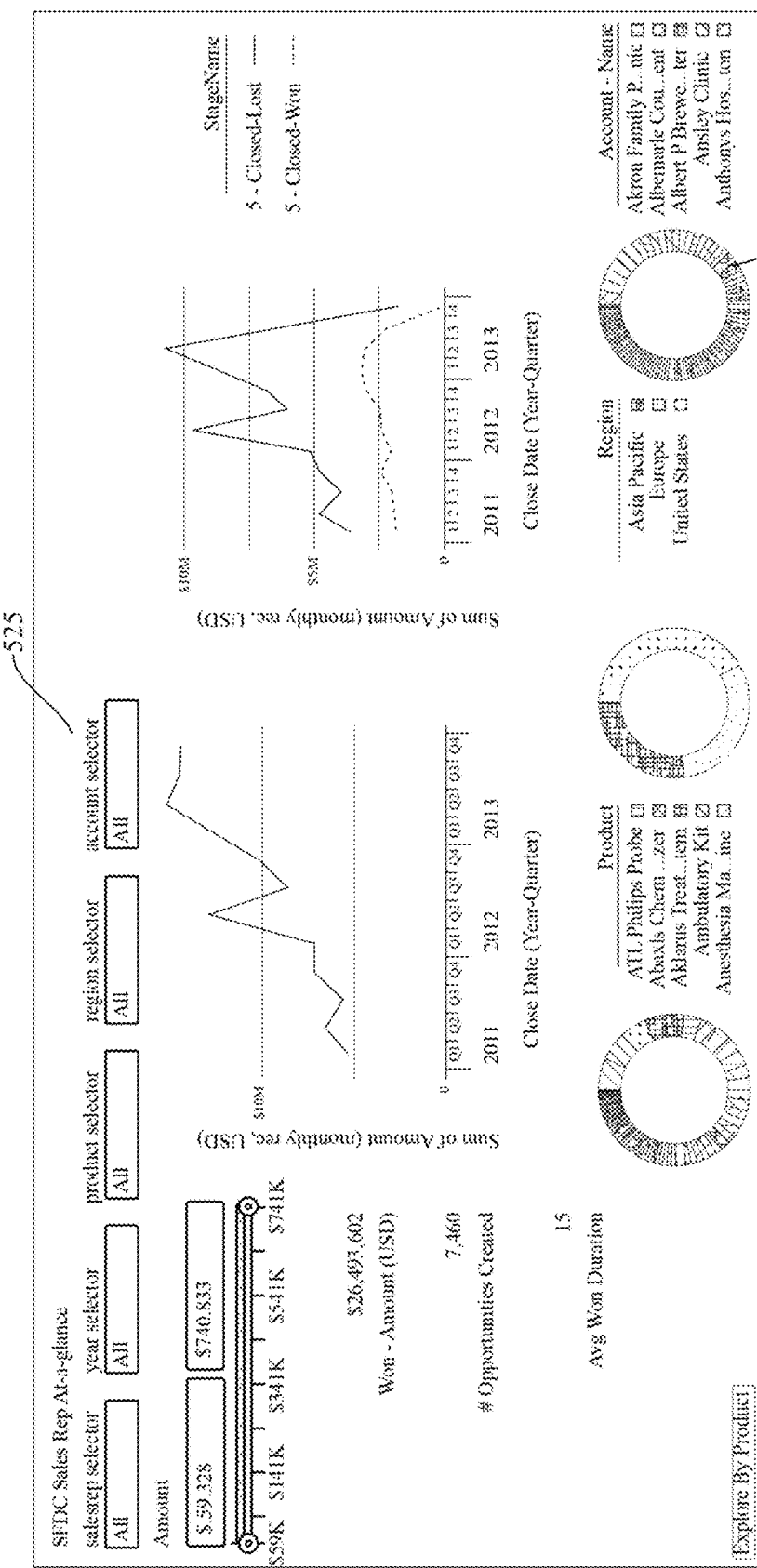
FIG. 5 shows and example dashboard with multiple lenses (prior art).

FIG. 5 (prior art) is shown as an example of a dashboard with multiple lenses. In this visualization, a user viewing the dashboard is not allowed to access the "Account Name" field. The dashboard includes two widgets which depend on this field: the right most filter selector—"account selector" 525 and the bottom right pie chart 568. Two display options include filtering these two components out of the dashboard, or rendering the dashboard and displaying an error message in place of those two lenses. As a third alternative, the user could be prevented from being able to view the dashboard at all.

In some implementations, a dataset can be created and cached, and the user's session can use the FLS information that existed when the dataset for the session was created. For this use case, the field level security restrictions that a user has when they begin a session will continue throughout the session.

A number of options are available to respond to changes in FLS that occur between extract/build cycles for security analytics. When cache time is zero, that is no caching at all, full security fidelity is achieved, with no security drift. In some implementations, caching of current values of the field level security for the fields in the analytical read-only database is valid for a limited time of one of 5-10 minutes, before querying for an update to the current values.

System Flow

Figure 6:
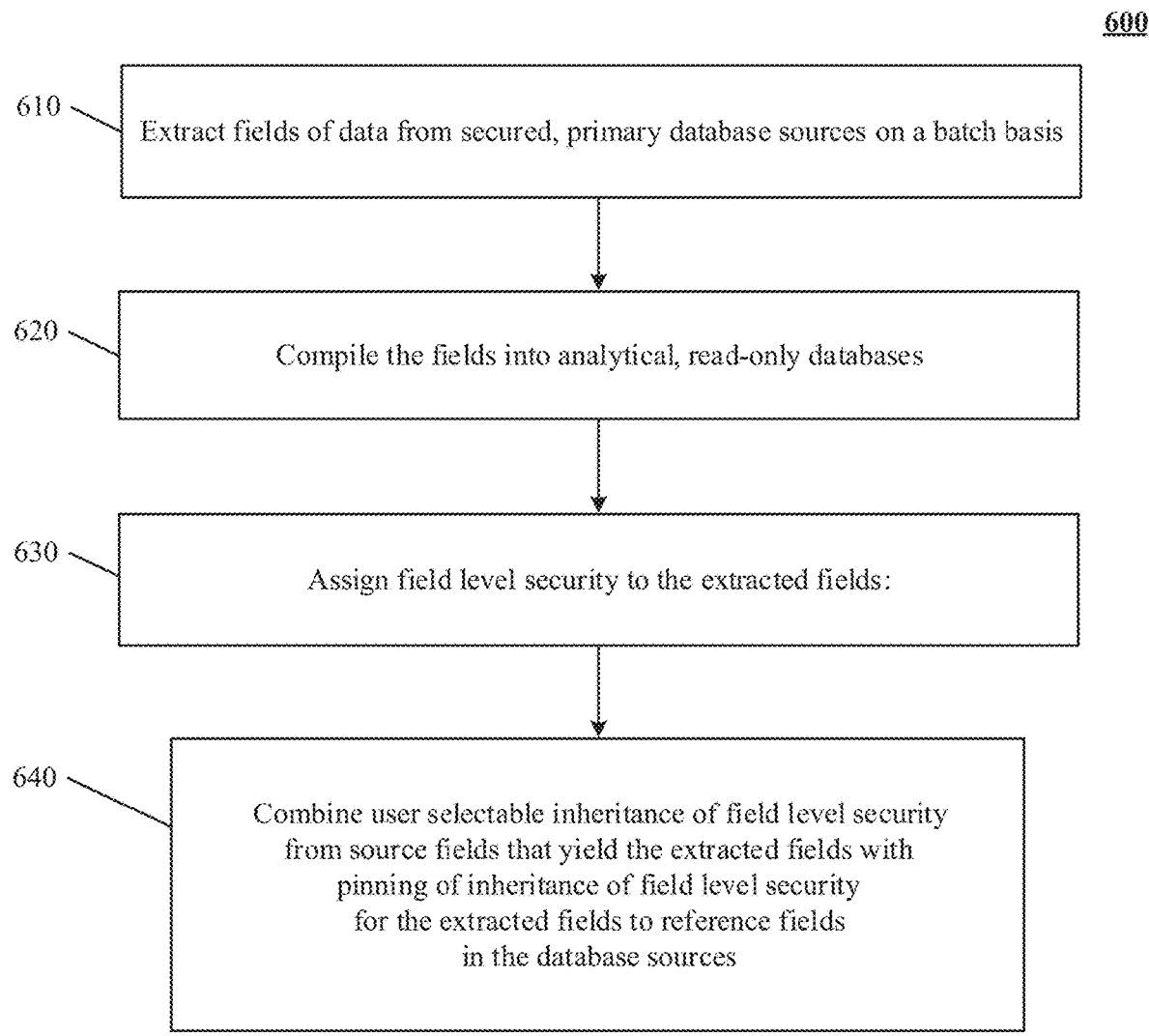
FIG. 6 shows an overview of the flow for implementing security for data for fields of data from a secured database.

FIG. 6 illustrates a flowchart of one implementation 600 of implementing fine grain security for analytic data sets. Flowchart 600 can be implemented at least partially with a database system, e.g., by one or more processors configured to receive or retrieve information, process the information, store results, and transmit the results. Other implementations may perform the steps in different orders and/or with different, fewer or additional steps than the ones illustrated in FIG. 6. The actions described below can be subdivided into more steps or combined into fewer steps to carry out the method described using a different number or arrangement of steps.

At action 610, the FLS engine 116 extracts fields of data from secured, primary database sources on a batch basis.

At action 620, the analytics FLS engine 146 compiles the fields into analytical read only data store 102.

At action 630, internal FLS engine 156 assigns field level security to the extracted fields, and can manage field level security metadata from multiple sources—including inherited, pinned and user-selected FLS.

At action 640 analytics FLS engine 146 combines user selectable inheritance of field level security from source fields that yield the extracted fields with pinning of inheritance of field level security for the extracted fields to reference fields in the database sources.

Multi-Tenant Integration

Figure 7:
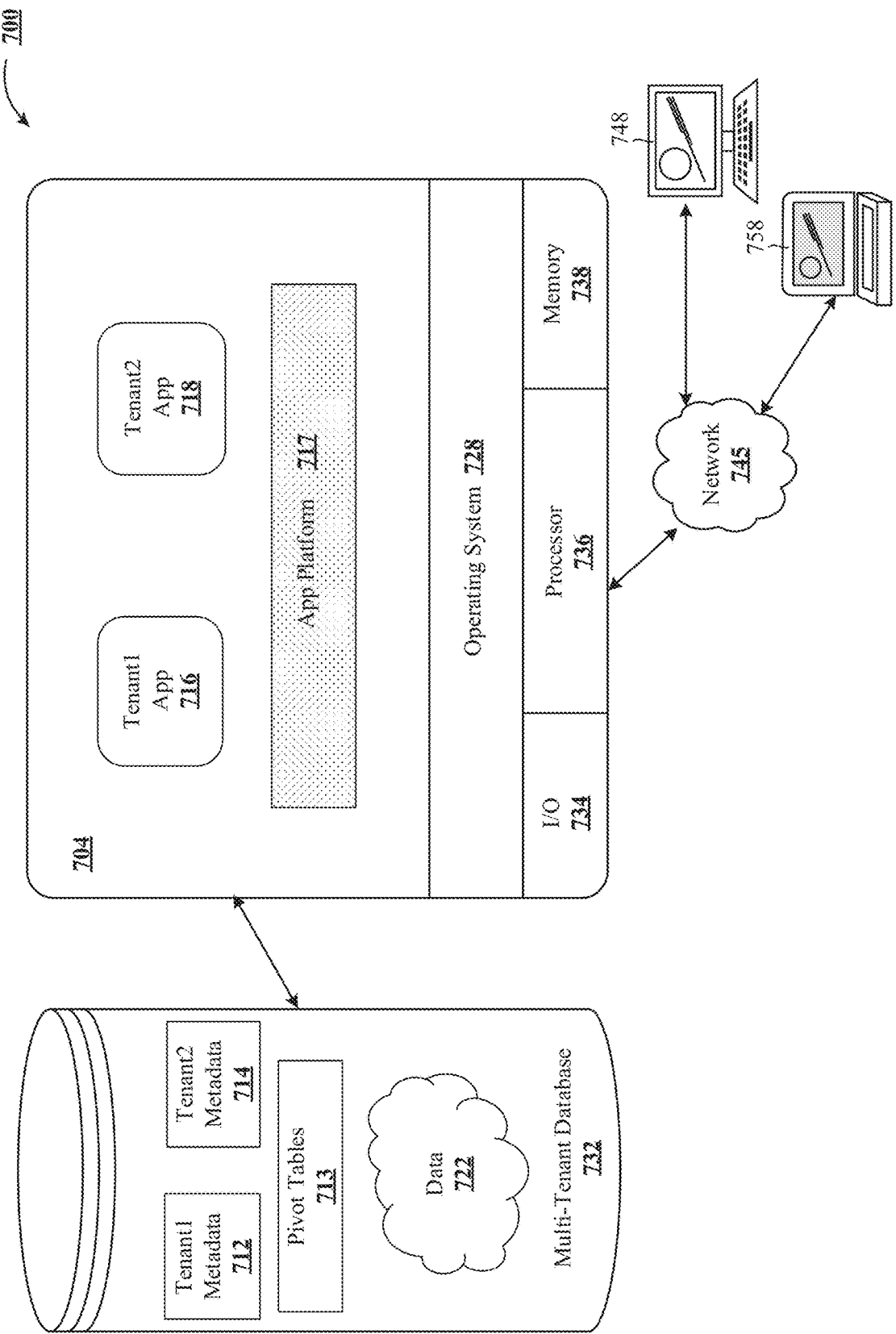
FIG. 7 is a block diagram of an example multi-tenant computer system capable of implementing fine grain security for analytic data sets.

FIG. 7 presents a block diagram of an exemplary multi-tenant system 700 suitable for integration with field level security environment 100 of FIG. 1. In general, the illustrated multi-tenant system 700 of FIG. 7 includes a server 704 that dynamically creates and supports virtual applications 716 and 718, based upon data 722 from a common database 732 that is shared between multiple tenants, alternatively referred to herein as a "multi-tenant database". Data and services generated by the virtual applications 716 and 718, including GUI clients, are provided via a network 745 to any number of client devices 748 or 758, as desired.

As used herein, a "tenant" or an "organization" refers to a group of one or more users that shares access to common subset of the data within the multi-tenant database 732. In this regard, each tenant includes one or more users associated with, assigned to, or otherwise belonging to that respective tenant. Stated another way, each respective user within the multi-tenant system 700 is associated with, assigned to, or otherwise belongs to a particular tenant of the plurality of tenants supported by the multi-tenant system 700. Tenants may represent users, user departments, work or legal organizations, and/or any other entities that maintain data for particular sets of users within the multi-tenant system 700. Although multiple tenants may share access to the server 704 and the database 732, the particular data and services provided from the server 704 to each tenant can be securely isolated from those provided to other tenants. The multi-tenant architecture therefore allows different sets of users to share functionality and hardware resources without necessarily sharing any of the data 722 belonging to or otherwise associated with other tenants.

The multi-tenant database 732 is any sort of repository or other data storage system capable of storing and managing the data 722 associated with any number of tenants. The database 732 may be implemented using any type of conventional database server hardware. In various implementations, the database 732 shares processing hardware with the server 704. In other implementations, the database 732 is implemented using separate physical and/or virtual database server hardware that communicates with the server 704 to perform the various functions described herein. The multi-tenant database 732 may alternatively be referred to herein as an on-demand database, in that the multi-tenant database 732 provides (or is available to provide) data at run-time to on-demand virtual applications 716 or 718 generated by the application platform 717, with tenant1 metadata 712 and tenant2 metadata 714 securely isolated.

In practice, the data 722 may be organized and formatted in any manner to support the application platform 717. In various implementations, conventional data relationships are established using any number of pivot tables 713 that establish indexing, uniqueness, relationships between entities, and/or other aspects of conventional database organization as desired.

The server 704 is implemented using one or more actual and/or virtual computing systems that collectively provide the dynamic application platform 717 for generating the virtual applications. For example, the server 704 may be implemented using a cluster of actual and/or virtual servers operating in conjunction with each other, typically in association with conventional network communications, cluster management, load balancing and other features as appropriate. The server 704 operates with any sort of conventional processing hardware such as a processor 736, memory 738, input/output features 734 and the like. The input/output 734 generally represent the interface(s) to networks (e.g., to the network 745, or any other local area, wide area or other network), mass storage, display devices, data entry devices and/or the like. User interface input devices 734 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 717.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from processor 736 to the user or to another machine or computer system.

The processor 736 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 738 represents any non-transitory short or long term storage or other computer-readable media capable of storing programming instructions for execution on the processor 736, including any sort of random access memory (RAM), read only memory (ROM), flash memory, magnetic or optical mass storage, and/or the like. The computer-executable programming instructions, when read and executed by the server 704 and/or processor 736, cause the server 704 and/or processor 736 to create, generate, or otherwise facilitate the application platform 717 and/or virtual applications 716 and 718, and perform one or more additional tasks, operations, functions, and/or processes described herein. It should be noted that the memory 738 represents one suitable implementation of such computer-readable media, and alternatively or additionally, the server 704 could receive and cooperate with external computer-readable media that is realized as a portable or mobile component or application platform, e.g., a portable hard drive, a USB flash drive, an optical disc, or the like.

The application platform 717 is any sort of software application or other data processing engine that generates the virtual applications 716 and 718 that provide data and/or services to the client devices 748 and 758. In a typical implementation, the application platform 717 gains access to processing resources, communications interfaces and other features of the processing hardware using any sort of conventional or proprietary operating system 728. The virtual applications 716 and 718 are typically generated at run-time in response to input received from the client devices 748 and 758.

With continued reference to FIG. 7, the data and services provided by the server 704 can be retrieved using any sort of personal computer, mobile telephone, tablet or other network-enabled client device 748 or 758 on the network 745. In an exemplary implementation, the client device 748 or 758 includes a display device, such as a monitor, screen, or another conventional electronic display capable of graphically presenting data and/or information retrieved from the multi-tenant database 732.

In some implementations, network(s) 745 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an ORACLE™ compatible database implementation, an IBM DB2 Enterprise Server compatible relational database implementation, a MySQL or PostgreSQL compatible relational database implementation or a Microsoft SQL Server compatible relational database implementation or a NoSQL non-relational database implementation such as a Vampire™ compatible non-relational database implementation, an Apache Cassandra™ compatible non-relational database implementation, a BigTable compatible non-relational database implementation or an HBase or DynamoDB compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

In one implementation, a disclosed method includes extracting fields of data from secured, primary database sources on a batch basis and compiling the fields into analytical, read-only databases; and assigning field level security to the extracted fields by combining user selectable inheritance of field level security from source fields that yield the extracted fields, with pinning of inheritance of field level security for the extracted fields to reference fields in the database sources wherein the reference fields are distinct from the extracted fields. The disclosed method can further include receiving additional fields as unsecured data sets; and assigning field level security to the additional fields received by combining user selectable explicit specification of field level security for the received fields, with pinning of inheritance of field level security for the received fields to reference fields in the database sources wherein the reference fields are distinct from the extracted fields.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

For some implementations, the user selectable assigning of field level security further includes assigning field level security by overriding inheritance of field level security from the extracted fields with explicit specification of field level security.

Implementations of the disclosed method for analytical, read-only databases implement response times of under two seconds when searching over twenty million records and compiling aggregate statistics from selected records.

For some implementations, the disclosed method of fine grain security for analytical data sets includes joining data from two or more objects in the primary database sources; and calculating field level security in one or more of the fields in the joined data based on a combination of field level security settings in the two or more objects.

In yet other implementations the method can include flagging user-selected reference fields in the database sources as a basis for the pinning; and causing display of a user interface that lists the flagged reference fields and enables user pinning of the extracted fields to the reference fields.

Implementations of the disclosed method further include a specification for extracting the fields of data that includes an advanced search comprising a user-entered string recognized as a field to which the user does not have field level access and treating the recognized string as not recognized.

For some implementations of the disclosed method, when a requested lens uses a field for which a user does not have field level security permission, the lens is not displayed; in some cases the display includes a message that the lens is not available. Handling of a dashboard that calls for a field that isn't available to a user can include a subset of lenses for the dashboard for which the user has field level security permission, and a message that communicates that the remaining lens is not available for viewing. In an implementation that includes an advance query specified by a string that calls for a field that isn't available to a user, no protected data for which the requesting user does not have security permission is displayed.

For yet other implementations, caching of user permissions for fields in the analytical read-only database is for a limited time including but not limited to one of 2-6 minutes, 3-8 minutes, or 4-10 minutes before refreshing the user permissions.

The disclosed method can further include caching current values of the field level security for the fields in the analytical read-only database for a limited time of one of 3-8 minutes, before querying for an update to the current values. In other implementations the method can include caching current values of the field level security for the fields in the analytical read-only database for a limited time of one of 4-9 minutes, before querying for an update to the current values; or can include caching current values of the field level security for the fields in the analytical read-only database for a limited time of one of 5-10 minutes, before querying for an update to the current values.

Other implementations may include non-transitory tangible computer readable media impressed with instructions that, when executed on a computer device and one or more servers, perform any of the processes described above.

Yet another implementation may include a computing system including at least one server comprising one or more processors and memory, coupled to the processors, containing computer instructions that, when executed on the processors, cause the computing system to perform any of the processes described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method comprising:
   extracting fields of data from one or more secured, primary database sources on a batch basis;
   assigning field level security to the fields, wherein the assigning comprises:
      identifying a first subset of the fields with user selectable inheritance, wherein the field level security for each field of the first subset of the fields is determined based at least in part on inheriting security from one or more source fields associated with the first subset of the fields extracted from the one or more secured, primary database sources; and
      identifying a second subset of the fields with pinnable inheritance, wherein the field level security for each field of the second subset of the fields is determined based at least in part on a user pinning inheritance of field level security for the second subset of the fields to reference fields, wherein the reference fields are bound to one or more attributes in the one or more secured, primary database sources and are distinct from the second subset of the fields;
   compiling the fields with the assigned field level security to obtain compiled fields, wherein the compiled fields support real-time querying by a dashboard for display in a graphical user interface (GUI);
   storing the compiled fields in one or more analytical, read-only databases, wherein the one or more analytical, read-only databases are distinct from the one or more secured, primary database sources;
   receiving a request for query results from a user; and
   producing, for display in the GUI, the query results from the compiled fields supporting the real-time querying based at least in part on the assigned field level security and subject to field level security permissions of the user.

2. The method of claim 1, further comprising:
   receiving additional fields as unsecured data sets; and
   assigning additional field level security to the received additional fields by combining user selectable explicit specification of the additional field level security for the received additional fields with pinnable inheritance of the additional field level security for the received additional fields to additional reference fields in the one or more secured, primary database sources, wherein the additional reference fields are distinct from the received additional fields and the extracted fields.

3. The method of claim 1, wherein assigning the field level security to the fields further comprises:
   assigning the field level security by overriding inheritance of field level security from the one or more secured, primary database sources with explicit specification of the field level security.

4. The method of claim 1,
   wherein supporting the real-time querying comprises the one or more analytical, read-only databases implementing response times of under two seconds when searching over twenty million records and compiling aggregate statistics from selected records.

5. The method of claim 1, further comprising:
   calculating a new field from data in two or more fields in the one or more secured, primary database sources; and
   calculating field level security in the new field based on a combination of field level security settings in the two or more fields.

6. The method of claim 1, further comprising:
   joining data from two or more objects in the one or more secured, primary database sources; and
   calculating field level security in one or more fields in the joined data based on a combination of field level security settings in the two or more objects.

7. The method of claim 1, further comprising:
   flagging user-selected reference fields in the one or more secured, primary database sources as a basis for pinning; and
   causing display of a user interface that lists the flagged reference fields and enables user pinning of the second subset of the fields to the reference fields.

8. The method of claim 1, wherein a specification for extracting the fields of data includes an advanced search comprising a user-entered string recognized as a field to which the user does not have field level access, the method further comprising:
   treating the recognized string as not recognized.

9. The method of claim 1, further comprising:
   caching current values of the field level security for the fields in the one or more analytical, read-only databases for a limited time before querying for an update to the current values.

10. A system including at least one server comprising one or more processors and memory coupled to the processors, the memory comprising computer instructions that, when executed on the processors, cause the system to:
    extract fields of data from one or more secured, primary database sources on a batch basis;
    assign field level security to the fields, wherein the assigning comprises:
       identifying a first subset of the fields with user selectable inheritance, wherein the field level security for each field of the first subset of the fields is determined based at least in part on inheriting security from one or more source fields associated with the first subset of the fields extracted from the one or more secured, primary database sources; and
       identifying a second subset of the fields with pinnable inheritance, wherein the field level security for each field of the second subset of the fields is determined based at least in part on a user pinning inheritance of field level security for the second subset of the fields to reference fields, wherein the reference fields are bound to one or more attributes in the one or more secured, primary database sources and are distinct from the second subset of the fields;

compile the fields with the assigned field level security to obtain compiled fields, wherein the compiled fields support real-time querying by a dashboard for display in a graphical user interface (GUI);

store the compiled fields in one or more analytical, read-only databases, wherein the one or more analytical, read-only databases are distinct from the one or more secured, primary database sources;

receive a request for query results from a user; and produce, for display in the GUI, the query results from the compiled fields supporting the real-time querying based at least in part on the assigned field level security and subject to field level security permissions of the user.

11. The system of claim 10, wherein the memory comprises further computer instructions that, when executed on the processors, cause the system to:

receive additional fields as unsecured data sets; and assign additional field level security to the received additional fields by combining user selectable explicit specification of the additional field level security for the received additional fields with pinnable inheritance of the additional field level security for the received additional fields to additional reference fields in the one or more secured, primary database sources, wherein the additional reference fields are distinct from the received additional fields and the extracted fields.

12. The system of claim 10, wherein assigning the field level security to the fields further comprises:

assigning the field level security by overriding inheritance of field level security from the one or more secured, primary database sources with explicit specification of the field level security.

13. The system of claim 10, wherein the one or more analytical, read-only databases implement response times of under two seconds when searching over twenty million records and compiling aggregate statistics from selected records.

14. The system of claim 10, wherein the memory comprises further computer instructions that, when executed on the processors, cause the system to:

calculate a new field from data in two or more fields in the one or more secured, primary database sources; and calculate field level security in the new field based on a combination of field level security settings in the two or more fields.

15. The system of claim 10, wherein the memory comprises further computer instructions that, when executed on the processors, cause the system to:

join data from two or more objects in the one or more secured, primary database sources; and calculate field level security in one or more fields in the joined data based on a combination of field level security settings in the two or more objects.

16. The system of claim 10, wherein the memory comprises further computer instructions that, when executed on the processors, cause the system to:

flag user-selected reference fields in the one or more secured, primary database sources as a basis for pinning; and cause display of a user interface that lists the flagged reference fields and enables user pinning of the second subset of the fields to the reference fields.

17. The system of claim 10, wherein a specification for extracting the fields of data includes an advanced search comprising a user-entered string recognized as a field to which the user does not have field level access, the memory further comprising computer instructions that, when executed on the processors, cause the system to:

treat the recognized string as not recognized.

18. The system of claim 10, wherein the memory comprises further computer instructions that, when executed on the processors, cause the system to:

cache current values of the field level security for the fields in the one or more analytical, read-only databases for a limited time before querying for an update to the current values.

19. One or more non-transitory tangible computer readable media impressed with instructions that are executable by a computer device and one or more servers to:

extract fields of data from one or more secured, primary database sources on a batch basis;

assign field level security to the fields, wherein the assigning comprises:

identifying a first subset of the fields with user selectable inheritance, wherein the field level security for each field of the first subset of the fields is determined based at least in part on inheriting security from one or more source fields associated with the first subset of the fields extracted from the one or more secured, primary database sources; and identifying a second subset of the fields with pinnable inheritance, wherein the field level security for each field of the second subset of the fields is determined based at least in part on a user pinning inheritance of field level security for the second subset of the fields to reference fields, wherein the reference fields are bound to one or more attributes in the one or more secured, primary database sources and are distinct from the second subset of the fields;

compile the fields with the assigned field level security to obtain compiled fields, wherein the compiled fields support real-time querying by a dashboard for display in a graphical user interface (GUI);

store the compiled fields in one or more analytical, read-only databases, wherein the one or more analytical, read-only databases are distinct from the one or more secured, primary database sources;

receive a request for query results from a user; and produce, for display in the GUI, the query results from the compiled fields supporting the real-time querying based at least in part on the assigned field level security and subject to field level security permissions of the user.

20. The one or more tangible computer readable media of claim 19, wherein the instructions are further executable by the computer device and the one or more servers to:

receive additional fields as unsecured data sets; and assign additional field level security to the received additional fields by combining user selectable explicit specification of the additional field level security for the received additional fields with pinnable inheritance of the additional field level security for the received additional fields to additional reference fields in the one or more secured, primary database sources, wherein the additional reference fields are distinct from the received additional fields and the extracted fields.

21. The one or more tangible computer readable media of claim 19, wherein assigning the field level security to the fields further comprises:

assigning the field level security by overriding inheritance of field level security from the one or more secured, primary database sources with explicit specification of the field level security.

22. The one or more tangible computer readable media of claim 19, wherein the one or more analytical, read-only databases implement response times of under two seconds when searching over twenty million records and compiling aggregate statistics from selected records.

23. The one or more tangible computer readable media of claim 19, wherein the instructions are further executable by the computer device and the one or more servers to:
   calculate a new field from data in two or more fields in the one or more secured, primary database sources; and
   calculate field level security in the new the field based on a combination of field level security settings in the two or more fields.

24. The one or more tangible computer readable media of claim 19, wherein the instructions are further executable by the computer device and the one or more servers to:
   join data from two or more objects in the one or more secured, primary database sources; and
   calculate field level security in one or more fields in the joined data based on a combination of field level security settings in the two or more objects.

25. The one or more tangible computer readable media of claim 19, wherein the instructions are further executable by the computer device and the one or more servers to:
   flag user-selected reference fields in the one or more secured, primary database sources as a basis for pinning; and
   cause display of a user interface that lists the flagged reference fields and enables user pinning of the second subset of the fields to the reference fields.

* * * * *